(12) United States Patent
Chen et al.

(10) Patent No.: US 8,284,317 B2
(45) Date of Patent: Oct. 9, 2012

(54) DEVICE AND METHOD FOR COLOR ADJUSTMENT

(75) Inventors: Yi Fan Chen, Taichung (TW); Wei Kuo Lee, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 1087 days.

(21) Appl. No.: 12/193,281

(22) Filed: Aug. 18, 2008

(65) Prior Publication Data

US 2009/0059080 A1 Mar. 5, 2009

(30) Foreign Application Priority Data

Aug. 28, 2007 (TW) ............................... 96131930 A

(51) Int. Cl.
 *H04N 9/73* (2006.01)
(52) U.S. Cl. ...................... 348/655; 348/223.1; 382/167
(58) Field of Classification Search .................. 348/655, 348/671, 223.1, 224.1, 225.1; 382/167; 345/87–102, 690, 691
 See application file for complete search history.

(56) References Cited

U.S. PATENT DOCUMENTS

| 6,271,825 | B1 * | 8/2001 | Greene et al. ................. 345/694 |
| 6,611,249 | B1 * | 8/2003 | Evanicky et al. ............ 345/102 |
| 6,791,606 | B1 * | 9/2004 | Miyano ....................... 348/223.1 |
| 6,862,012 | B1 * | 3/2005 | Funakoshi et al. ............... 345/88 |
| 7,190,394 | B2 * | 3/2007 | Kaplinsky et al. ......... 348/223.1 |
| 7,262,883 | B2 | 8/2007 | Kim et al. |
| 7,405,771 | B2 | 7/2008 | Lee et al. |
| 7,512,266 | B2 | 3/2009 | Chen et al. |
| 7,791,649 | B2 * | 9/2010 | Kim et al. .................. 348/223.1 |
| 7,899,244 | B2 * | 3/2011 | Makino ......................... 382/167 |
| 2004/0057615 | A1 * | 3/2004 | Johannesson et al. ........ 382/167 |

FOREIGN PATENT DOCUMENTS

| CN | 1437400 | 8/2003 |
| CN | 1764282 | 4/2006 |
| TW | 280794 | 5/2007 |

* cited by examiner

*Primary Examiner* — Annan Shang

(74) *Attorney, Agent, or Firm* — Edell, Shapiro & Finnan, LLC

(57) ABSTRACT

Device and method for color adjustment for adjusting white color of an image including a weight generating unit, a color shift value generating unit, and an adjustment unit. The weight generating unit receives a first color value of the image and generates a weight according to the first color value. The color shift value generating unit receives the first color value and the weight and generates a color shift value according to the first color value and the weight. The adjustment unit receives the first color value and the color shift value and generates a second color value according to the first color value and the color shift value.

19 Claims, 7 Drawing Sheets

DEVICE AND METHOD FOR COLOR ADJUSTMENT

FIELD OF THE INVENTION

The present invention relates to a television tuner, and more particularly to a color adjustment device and adjusting method for adjusting a color value for an image being displayed.

BACKGROUND OF THE INVENTION

In general, it is desirable to improve the quality of image display devices, such as a generic television set. From traditional cathode ray tube (CRT) display technology to current liquid crystal display (LCD) technology, image display quality has advanced significantly. However, the image, as a result of the transmitting and transferring process is typically different from the original image. Even given a same original image and transmitting process, image display devices with different configurations and display performances may show different output images. This phenomenon is referred to as "color shift," and results from distortion that occurs during image signal transmission and image processing. In addition, individuals perceive differently when viewing an image of the same object. For example, Asians and Europeans, due to the iris color of a pupil, have different preferences with respect to warm and cold colors.

Accordingly, a generic image display device provides a color correction function to allow a user to adjust image display properties of the image display device to fit the user's preferences. Further, color adjustment of an image display device depends on the output properties of color temperatures. Color temperature is measured by a color temperature unit Kelvin. Various color temperatures define different colors along the spectrum. When the color temperature is set at lower value such as 2,000K to 3,000K, the output color is a warm color, a bright red. When the color temperature is set at a higher value, such as 8,000K to 10,000K, the output color is a cold color, a gentle blue. Traditionally, image display devices are preset according to customer requirements or set at standard color temperature 5,000K as a default color temperature before shipping from factories.

The output properties of an image display device can also be adjusted by related settings of the image display devices (such as color management or color compensation function used in the monitor display properties settings of a computer system) by a user. The parameters include brightness, contrast, sharpness, gamma value and color value. By adjusting these parameters, users can perform required adjustments on image signals output to an image display device to attain desired quality of image display.

By increasing and decreasing the level of, e.g., brightness, contrast, sharpness, and/or gamma value, the adjusted image is displayed in real-time on the screen with modified brightness, added or lowered contrast between colors, or gamma curve adjustment to allow the naked eye to perceive detailed layers of dark and bright colors of dark and bright images with settings at higher and lower gamma values.

The above adjustment to adjust the color uses red/green/blue values or gamma tables. In addition, users can adjust the gain/offset of the red/green/blue signals individually to generate desirable image display output.

Nonetheless, it is challenging to attain a desirable image display quality by only adjusting white color. In the above method, adjusting a parameter or performing an adjustment on one of the RGB colors results in changes to the adjustment of a parameter or adjustment of one of the RGB true colors made in a previous step. That is, one adjustment step on one parameter or one true color impacts other parameters and true colors. Thus, improved color adjustment methodologies are desirable.

SUMMARY OF THE INVENTION

Therefore, the present invention provides a color adjustment device and a color adjustment method to enable effective white correction performed on an image display device.

The present invention provides a color adjustment device for adjusting white color of an image. The color adjustment device comprises a weight generating unit for receiving a first color value of said image and generating a weight according to the first color value; a color shift value generating unit for receiving said first color value and said weight and generating a color shift value according to said first color value and said weight; and an adjustment unit for receiving said first color value and said color shift value and generating a second color value according to said first color value and said color shift value.

The present invention further provides a color adjustment device for adjusting white color of an image. The color adjustment device comprises a grey level generator for receiving a first color value of said image and generating a grey level; a grey level transform unit for receiving said grey level and generating a color shift transform value; a color shift value calculator for receiving said color shift transform value and generating a color shift value; and an adjustment unit for receiving said first color value and said color shift value and generating a second color value according to said first color value and said color shift value.

The present invention further provides a method for color adjustment for adjusting white color of an image. The method comprises receiving a first color value of said image and generating a weight based on the first color value; receiving said first color value and said weight and generating a color shift value based on said first color value and said weight; and receiving said first color value and said color shift value and generating a second color value based on said first color value and said color shift value.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
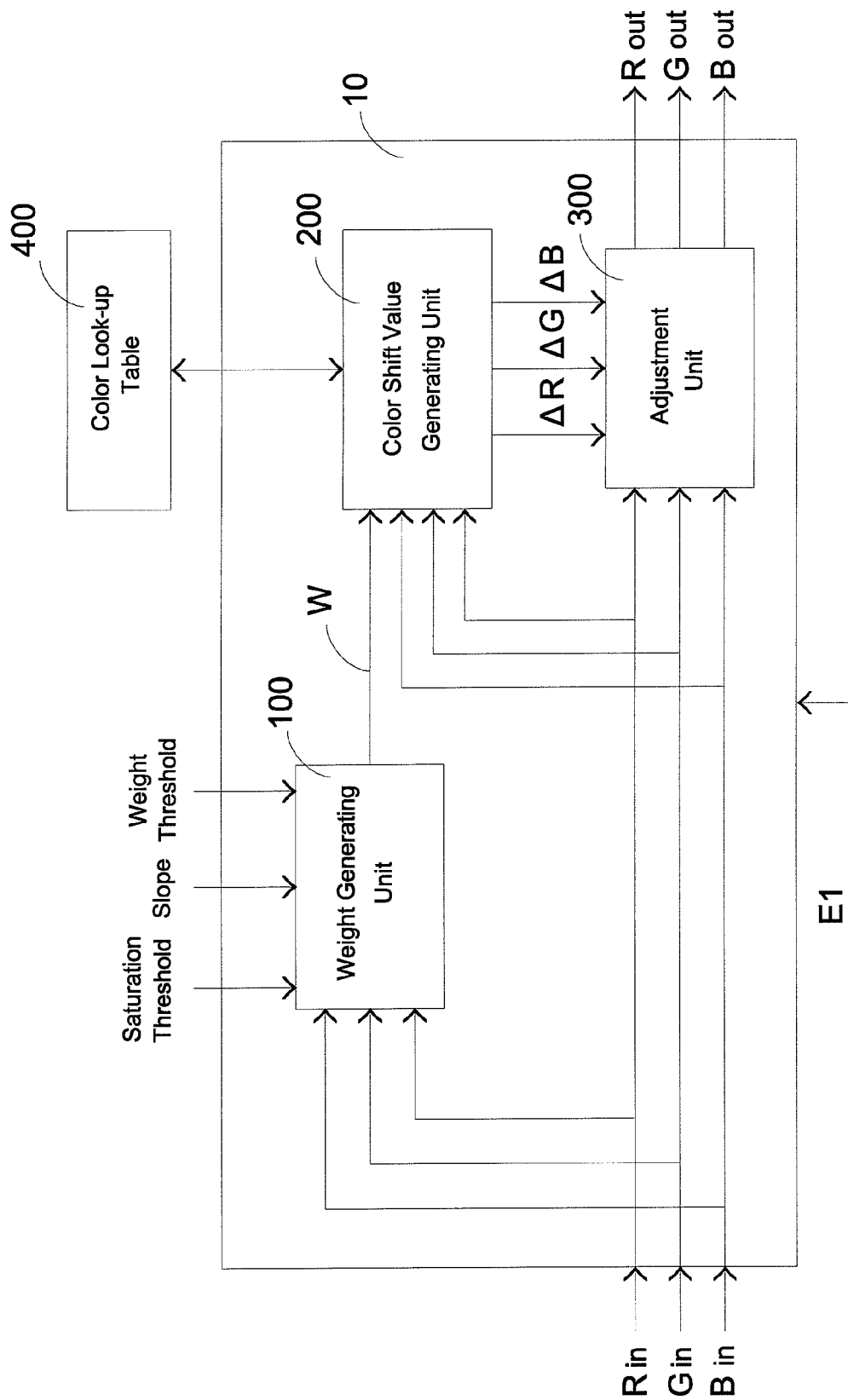
FIG. 1 is a block diagram of a color adjustment device in accordance with an embodiment of the present invention.

FIG. 1 shows the color adjustment device 10 of a preferred embodiment according to the present invention. The color adjustment device 10 of the preferred embodiment is applied to an image display device of a generic television set or monitor for adjusting the color properties of an image received by the image display device. The color adjustment device 10 comprises: a weight generating unit 100, a color shift value generating unit 200 and an adjustment unit 300. The weight generating unit 100 generates a weight according to the color value of the image. The color shift value generating unit 200 generates a color shift value according to the color value of the image and the weight. The adjustment unit 300 generates an adjusted color value according to the color value of the image and the color shift value.

According to FIG. 1, the color adjustment device 10 is controlled by a trigger signal E1. The color adjustment device 10 starts to operate when the device is triggered by the trigger signal E1. The trigger signal E1 is sent by a processor or an image process unit of the image display device.

In the present preferred embodiment, the first color value is input to the weight generating unit 100, the color shift value generating unit 200 and the adjustment unit 300. The first color value is defined by the RGB colors, which is represented by coordinates (Rin, Gin, Bin).

In FIG. 1, the weight generating unit 100 performs a first computing on first color value (Rin, Gin, Bin) to generate a weight W according to a predetermined saturation threshold value, weight threshold value and slope value. The color shift value generating unit 200 receives the weight W and the first color value (Rin, Gin, Bin), and performs a second computing according to a look-up table to generate a color shift value ($^\Delta R$, $^\Delta G$, $^\Delta B$) (which is also represented in RGB colors). The color shift value ($^\Delta R$, $^\Delta G$, $^\Delta B$) is sent to the adjustment unit 300. The adjustment unit 300 receives the first color value (Rin, Gin, Bin) and the color shift value ($^\Delta R$, $^\Delta G$, $^\Delta B$) then performs a third computing to generate a second color value (Rout, Gout, Bout). The second color value is the adjusted result by the color adjustment device 10 of the present invention.

YUV form is another color form that is different from RGB form. Y represents brightness, also known as luminance or grey level, U represents hue and V represents saturation. U and V together represent chroma. According to the prior art of color adjustment on image color, only adjusting the Y value to calibrate white color of the image has the benefit of having the least impact on image of other colors and consequentially is a convenient method to attain desirable result of a user. Therefore, detailed operating steps of the transformation between color values and grey levels of an image by first computing, second computing and third computing according to the present invention are described as the following.

Figure 2A:
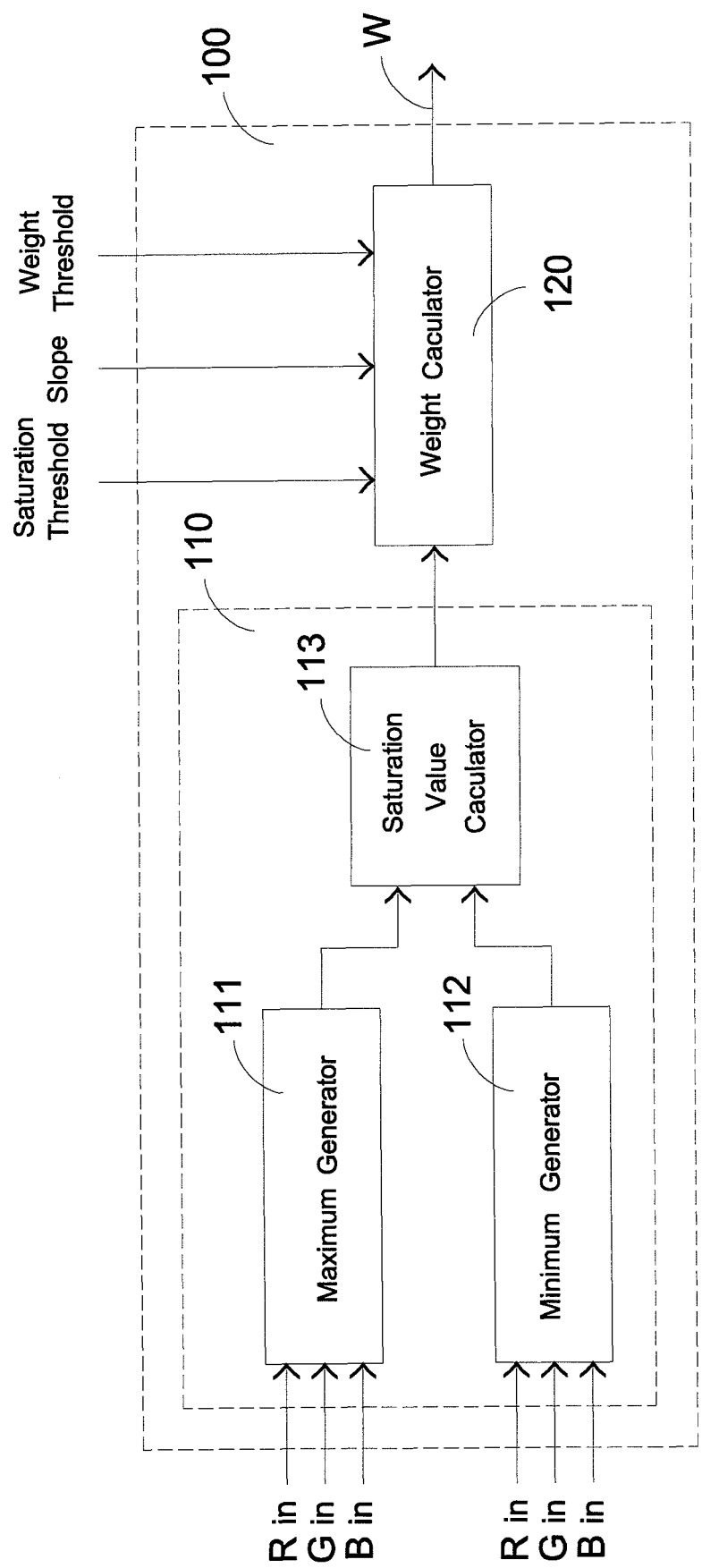
FIG. 2a is a block diagram of a weight generating unit in accordance with an embodiment of the present invention.

FIG. 2a shows a block diagram of the weight generating unit 100. As shown in the FIG. 2a, the weight generating unit 100 according to the present invention further comprises: a saturation value generating unit 110 and a weight calculator 120. The saturation value generating unit 110 further comprises: a maximum generator 111, a minimum generator 112 and a saturation value calculator 113. The maximum generator 111 and the minimum generator 112 receive the first color value (Rin, Gin, Bin). In the present preferred embodiment, Rin, Gin and Bin are three color components of the first color value. The maximum generator 111 and the minimum generator 112 select the maximum and the minimum among the color components and output the maximum and the minimum to the saturation value calculator 113. The saturation value calculator 113 subtracts the minimum from the maximum then generates a saturation value. The saturation value is sent to the weight calculator 120.

Figure 2B:
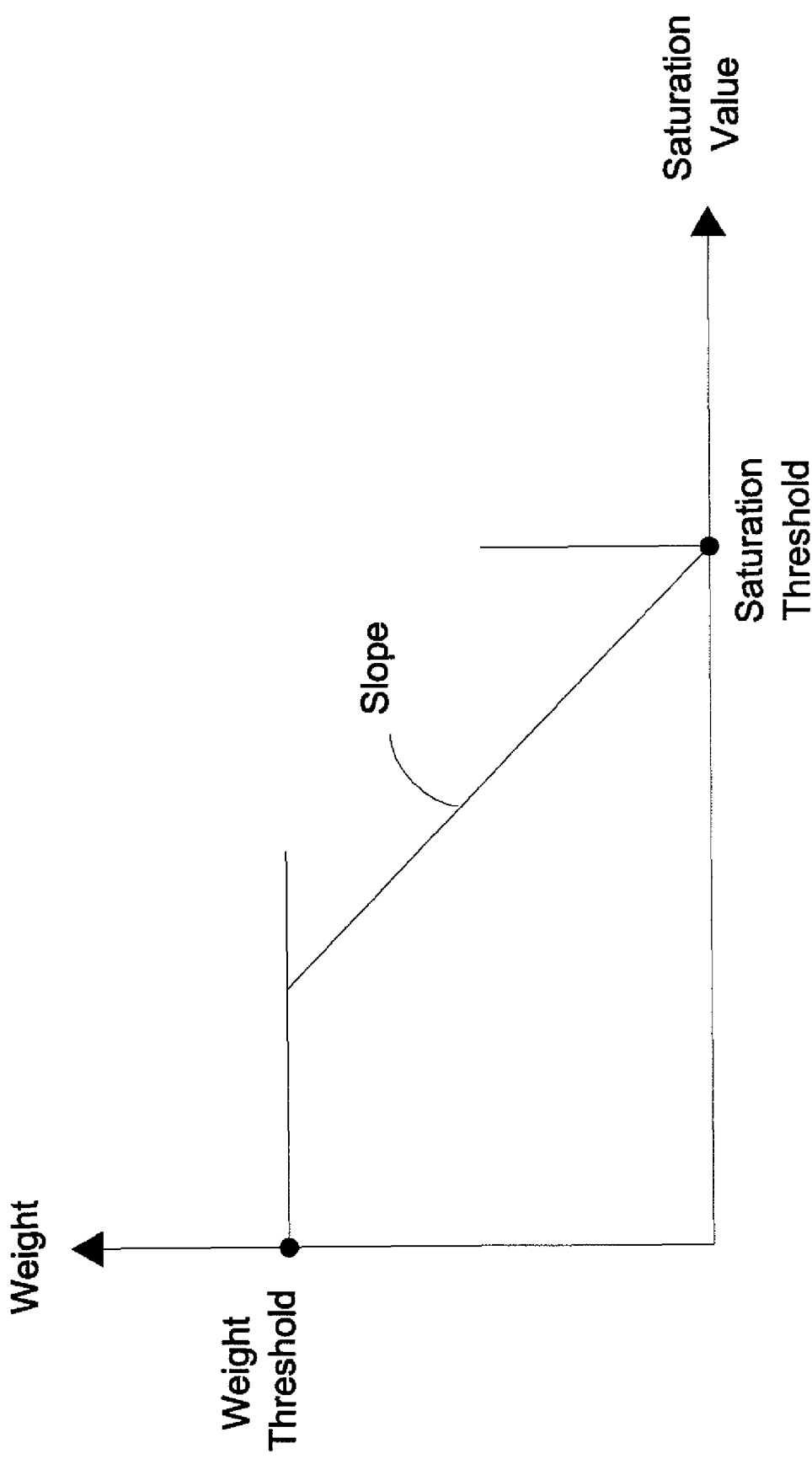
FIG. 2b is a relation graph between weight and saturation value in accordance with an embodiment of the present invention.

The weight calculator 120 generates the weight W via computing of said weight function on the saturation value. The weight function is determined by the saturation threshold value, the weight threshold value and the slope. FIG. 2b illustrates a relation graph between weight and saturation value of a preferred embodiment according to the present invention. As shown in the graph, when the saturation value is larger than the saturation threshold value, the weight W is determined as 0; when the saturation value is less than the saturation threshold value, the weight W is the corresponding value determined according to the curve shown in the relation graph. When the weight is larger than the weight threshold value, then the weight is determined as the weight threshold value.

Figure 3:
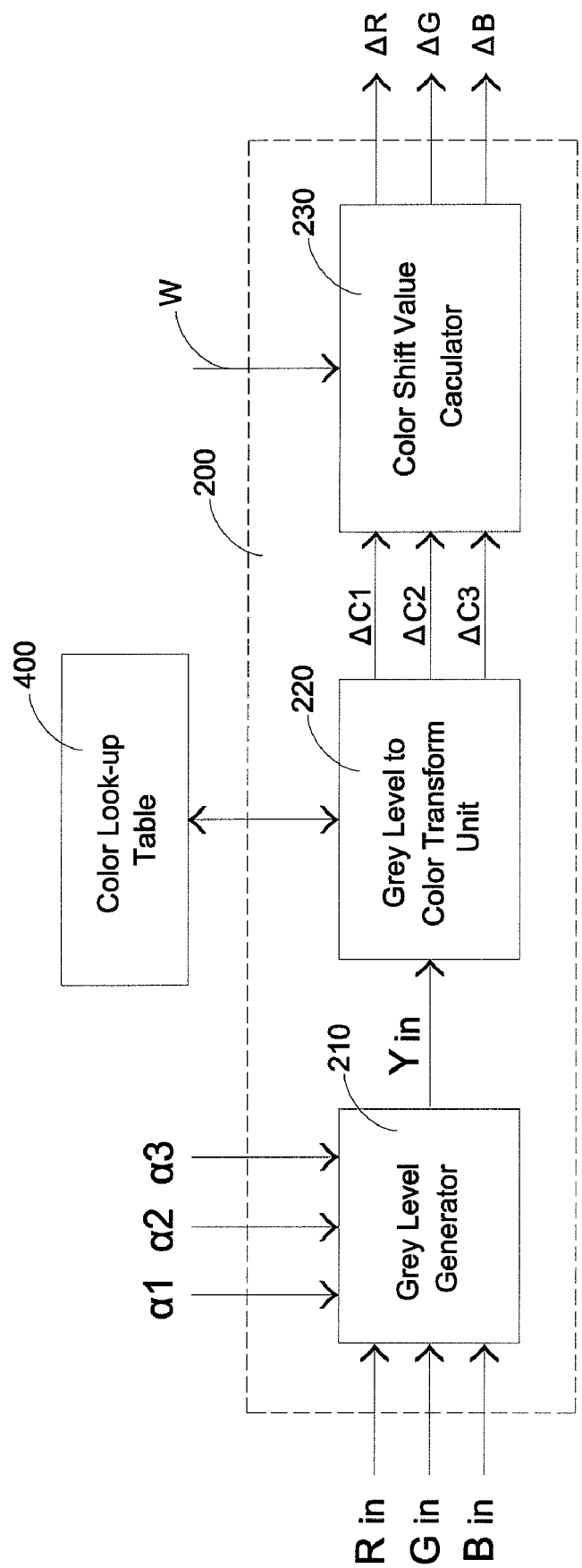
FIG. 3 is a block diagram of a color shift value generating unit in accordance with an embodiment of the present invention.

FIG. 3 is a block diagram illustrating the color shift value generating unit 200. As shown in the diagram, in the present preferred embodiment, the color shift value generating unit 200 further comprises: a grey level generator 210, a transform unit 220 and a color shift value calculator 230. According to the embodiment, the above mentioned second computing process generates the color shift value ($^\Delta R$, $^\Delta G$, $^\Delta B$) and following operating steps are as follows: the grey level generator 210 receives the first color value (Rin, Gin, Bin) and performs a linear combination of the first color value (Rin, Gin, Bin) and predetermined set values ($\alpha 1$, $\alpha 2$, $\alpha 3$) to generate a grey level Yin. The grey level Yin is represented by ($\alpha 1 \ast \text{Rin} + \alpha 2 \ast \text{Gin} + \alpha 3 \ast \text{Bin}$), wherein $\alpha 1 + \alpha 2 + \alpha 3 = 1$, which is a transform method from RGB colors to YUV colors. The transform unit 220 receives the grey level Yin, and the grey level Yin is used for a look-up step in the color look-up table 400 to generate a color transform value ($^\Delta C1$, $^\Delta C2$, $^\Delta C3$). As a result, the color shift value calculator 230 receives the color transform value ($^\Delta C1$, $^\Delta C2$, $^\Delta C3$) and the weight W generated by the weight calculator 120, and then the color shift value calculator 230 generates the color shift value ($^\Delta R$, $^\Delta G$, $^\Delta B$).

Figure 4A:
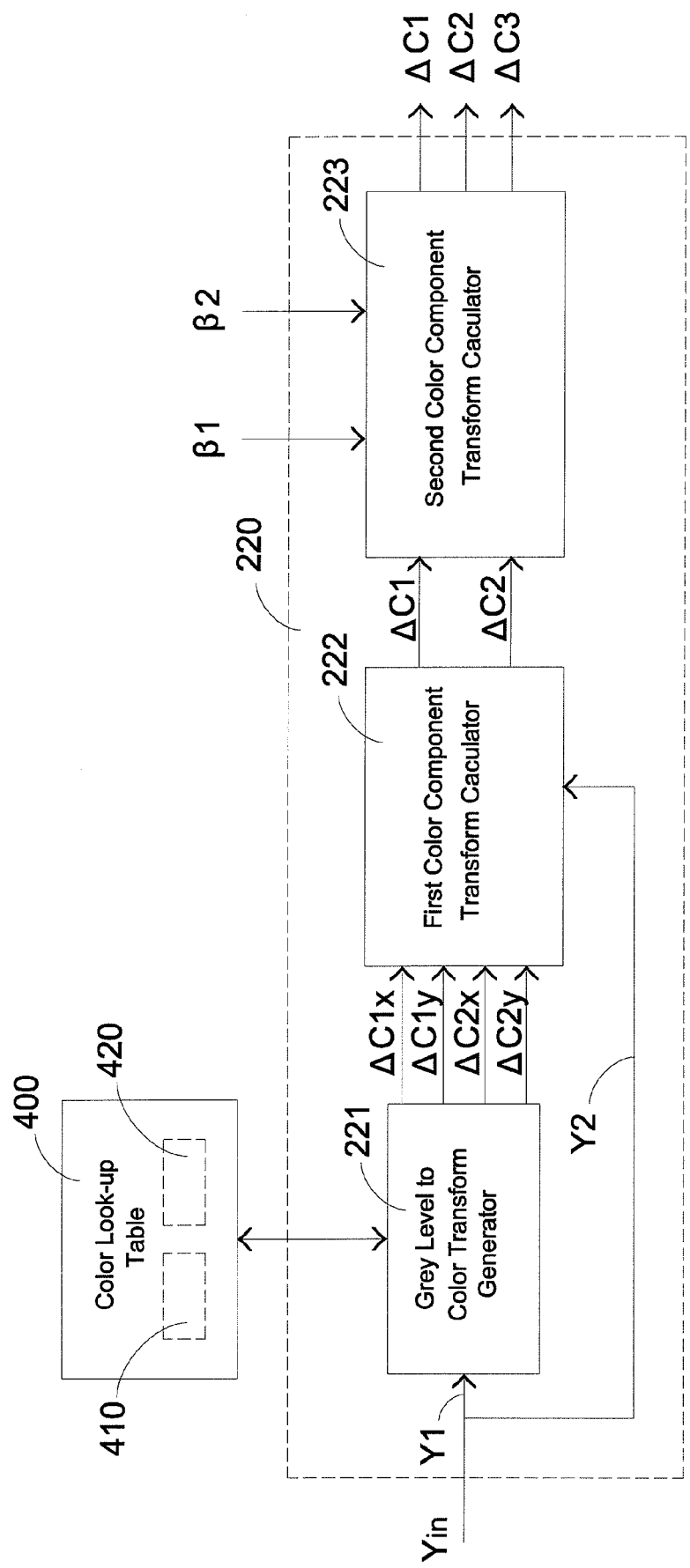
FIG. 4a is a block diagram of a transform unit of the color shift value generating unit in accordance with an embodiment of the present invention.

A detailed transformation and generation process of the color transform value ($^\Delta C1$, $^\Delta C2$, $^\Delta C3$) in the second computing is further described in FIG. 4a. FIG. 4a is a block diagram of the transform unit 220 of the color shift value generate unit 200. As shown in the diagram, the transform unit 220 of the embodiment further comprises: a grey level color transform value generator 221, a first color component transform calculator 222 and a second color component transform value calculator 223.

In the embodiment, to save data record space of the color look-up table 400, only two sets of color shift value look-up transformation data 410, 420 are recorded in the color look-up table 400. The color shift value look-up transformation data 410, 420 are look-up transformation data of two colors among three RGB colors and are stored as the relation between Yin and $^\Delta R/^\Delta G$, $^\Delta G/^\Delta B$, or $^\Delta R/^\Delta B$. In addition, only part of the bits of the grey level Yin are input to the grey level to color transform generator 221. For example, if the grey level Yin has M bits, only n bits of data are selected (represented as Yin[M:n]) and input to the grey level to color transform generator 221 (line Y1). The grey level to color transform generator 221 receive Yin[M:n] for performing look-up in the color look-up table 400.

Figure 4B:
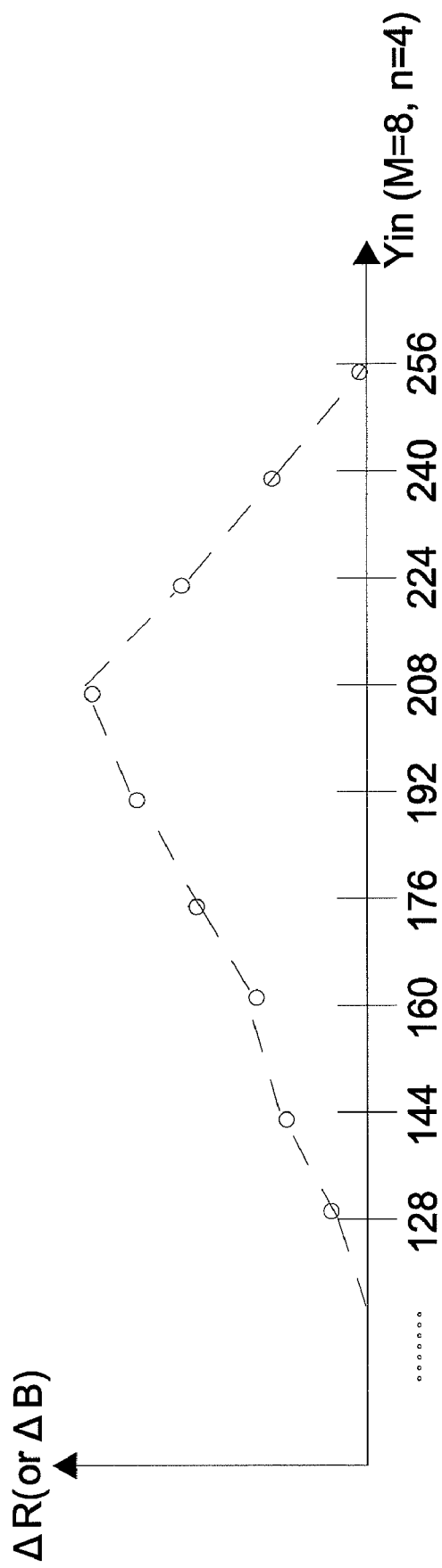
FIG. 4b is a plot illustrating transfer data lookup of the color look-up table in accordance with an embodiment of the present invention.

FIG. 4b is a plot illustrating transfer data lookup of the color look-up table 400. In the embodiment, to save data record space of the color look-up table 400, only two of the three color components are selected as look-up transformation reference. The Y axis in FIG. 4b is represented as $^\Delta$R (or $^\Delta$B or $^\Delta$G) as the adjusting level of look-up transformation and the corresponding curve is a predetermined. For saving color recording space of the color look-up table 400, the table only records part of the corresponding transformation data. For example in FIG. 4b, the grey level Yin has 8 bits, and only the first 4 bits are selected to record the corresponding transformation data in the color look-up table 400. When M is 8 and n is 4 in the Yin[M:n], the data recording size is 2^(M−n+1), which is 2^5. After the grey level to color transform generator 221 receives the grey level Yin[8:4], assisted by the process of the line Y1, a corresponding value of transformation data is gained according to the table shown in FIG. 4b.

However, due to the fact that the records in the look-up table and selection of the grey level Yin are compressed, the correct transformation result is generated by interpolation with the adjacent corresponding values. In the embodiment, the grey level to color transform generator 221 generates two grey level color mapping value $^\Delta$C1x, $^\Delta$C1y of one color component and two grey level color mapping value $^\Delta$C1x, $^\Delta$C1y of the other color component via the look-up. Accordingly, the first color value component shifts transform calculator 222 according to the correlations of the grey level and the mapping values between grey level and RGB colors to perform interpolation, in other words, to perform interpolation with the rest of the bits of input the grey level Yin[n−1:0] via line Y2. Consequentially, the first color component transform value $^\Delta$C1 is generated by interpolation of the grey level color mapping value $^\Delta$C1x, $^\Delta$C1y, and the second color component transform value $^\Delta$C2 is generated by interpolation of the grey level color mapping value $^\Delta$C2x, $^\Delta$C2y.

Lastly, the second color component transform calculator 223 generates the third color component shift transform value $^\Delta$C3 (represented as ($\beta 1 *^\Delta C1+\beta 2 *^\Delta C2$)) according to two predetermined values $\beta 1$, $\beta 2$, by performing linear combination of the first and the second color component transform value $^\Delta$C1, $^\Delta$C2 so that the color transform value ($^\Delta$C1, $^\Delta$C2, $^\Delta$C3) of three color components is generated.

At the end of the second computing process, the color shift value calculator 230 receives the color transform value ($^\Delta$C1, $^\Delta$C2, $^\Delta$C3) and processes the color transform value with the weight W, for example, to directly multiply the color transform value ($^\Delta$C1, $^\Delta$C2, $^\Delta$C3) and the weight W to generate the aforementioned color shift value ($^\Delta$R, $^\Delta$G, $^\Delta$B). Therefore, the color shift value ($^\Delta$R, $^\Delta$G, $^\Delta$B) used for adjusting first color value (Rin, Gin, Bin) in preferred embodiment is attained with the weight W and the color transform value ($^\Delta$C1, $^\Delta$C2, $^\Delta$C3).

The last part of the preferred embodiment is the third computing. The third computing is processing the first color value (Rin, Gin, Bin) and the color shift value ($^\Delta$R, $^\Delta$G, $^\Delta$B) via the adjustment unit 300, for example, adding the first color value (Rin, Gin, Bin) and the color shift value ($^\Delta$R, $^\Delta$G, $^\Delta$B) to generate the second color value (Rout, Gout, Bout). The resulting second color value (Rout, Gout, Bout) is the adjusted image display data by the color adjustment device 10 according to the present invention.

As noted, to save data record space of the color look-up table 400, only two sets of color shift value look-up transformation data 410, 420 are recorded in the color look-up table 400. Due to the reduced record data, the complete grey level and color transformation data is attained via interpolation and linear combination processing using the first and second color component transform calculators 222, 223. Via computing with interpolation and linear combination, detailed corresponding grey level for attaining the required correct transformation data is possible. Nonetheless, where sufficient data space of the color look-up table 400 is available, grey level color transformation data required by three color components can be recorded in the color look-up table 400. The grey level to color transform generator 221 receives the grey level Yin representing all data bits and directly transforms the grey level and color values according to the look-up with the table, such that the color transform value ($^\Delta$C1, $^\Delta$C2, $^\Delta$C3) required during color transformation are attained at one step. In other words, it is not required to perform interpolation by the first color value component shift transform calculator 222 and to perform the linear combination by the second color component transform calculator 223.

Figure 5:
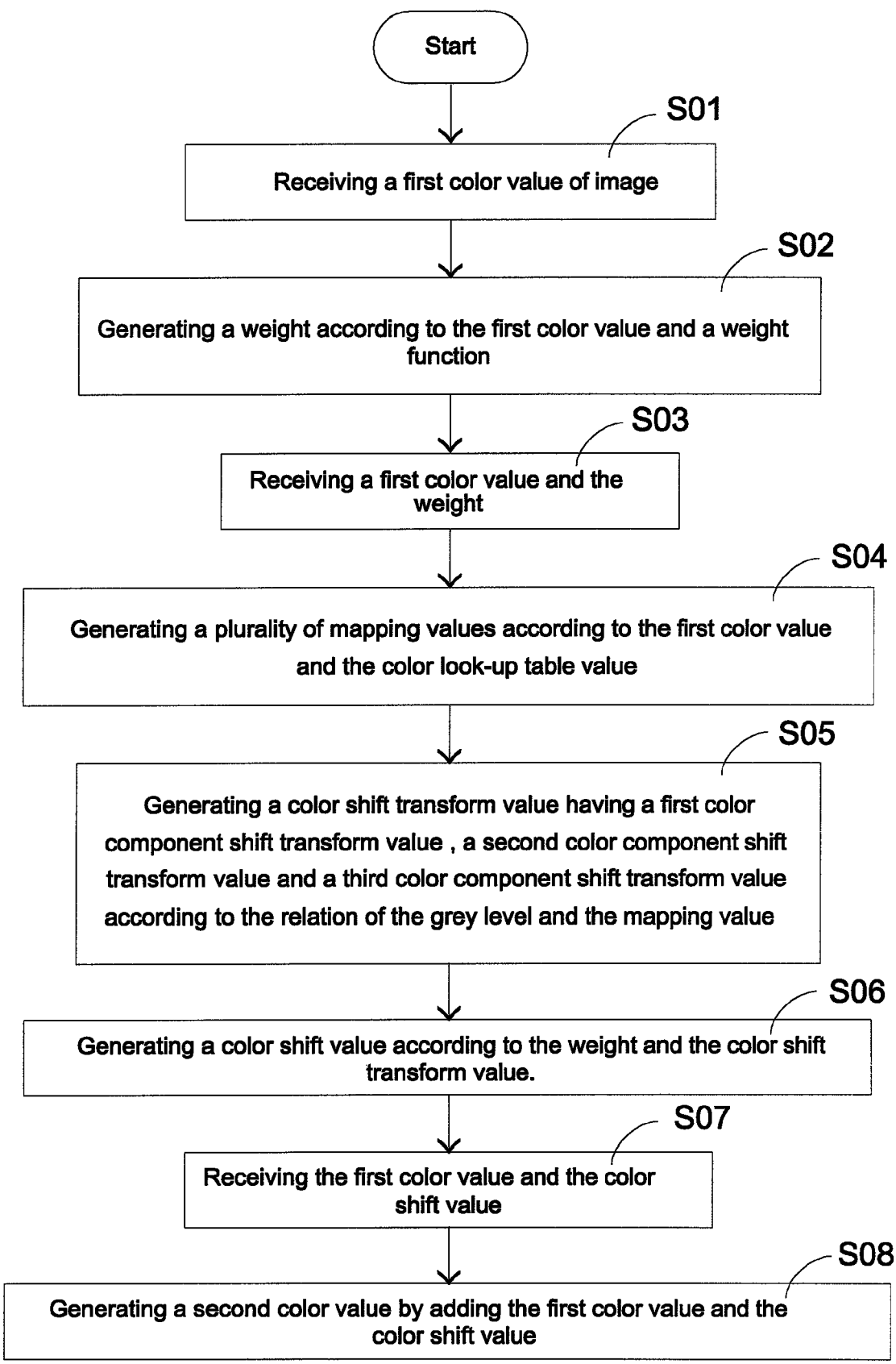
FIG. 5 is an example flow chart of color adjustment method in accordance with an embodiment of the present invention.

FIG. 5 is an example flow chart of a color adjustment method of a preferred embodiment according to the present invention. The first step is receiving a first color value of the image (step S01). The following step is generating a saturation value according to the first color value, computing of said weight function and generating a weight (step S02). The next step is receiving the first color value and the weight (step S03). This is followed by generating the grey level according to the first color value and performing a look-up according to a color look-up table and further generating a plurality of mapping values between grey level and RGB colors (step S04). Thereafter, the method includes generating a color shift transform value having a first color component shift transform value, a second color component shift transform value and third color component shift transform value (step S05) according to the relation of the grey level and the grey level color mapping value. The next step is generating a color shift value according to the weight and the color transform value (step S06). Final steps include receiving the first color value and the color shift value (step S07), then adding the first color value and the color shift value together to gain second color value which the color value is adjusted (step S08).

To summarize, the color adjustment device and corresponding method performs color adjustment on pixels of single color value range of display image. A preferred application is to perform color adjustment on pixels of white color value range of a display image such that the complications raised in the color adjustment process used for the display color image in the prior art is avoided. In the preferred embodiment, the weight generating unit 100 transforms the color value of RGB true colors into the grey level of the YUV colors. The grey level is related to the white component of white in an image. With the predetermined look-up table, required color adjustment amount is generated, whereby the method provides a better visual experience by users by only adjusting the white color part of the image. Accordingly, the color adjustment device and corresponding method according to the present invention overcome deficiencies in the prior art and offer a convenient means to provide a better display image.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A color adjustment device for adjusting the white color of an image, said device comprising:
   a weight generating unit for receiving a first color value of said image and generating a weight according to the first color value;
   a color shift value generating unit for receiving said first color value and said weight and generating a color shift value according to said first color value and said weight; and
   an adjustment unit for receiving said first color value and said color shift value and generating a second color value according to said first color value and said color shift value.

2. The color adjustment device of claim 1, wherein said weight generating unit comprises:
   a saturation value generating unit for receiving said first color value and generating a saturation value; and
   a weight calculator for receiving said saturation value and generating said weight by a weight function with said saturation value.

3. The color adjustment device of claim 2, wherein said first color value comprises a plurality of color components and said saturation value generate unit comprises:
   a maximum generator for selecting maximum from said plurality of color components;
   a minimum generator for selecting minimum from said plurality of color components; and
   a saturation value calculator for generating said saturation value according to said maximum and said minimum.

4. The color adjustment device of claim 3, wherein said saturation value is determined by subtracting said minimum from said maximum.

5. The color adjustment device of claim 4, wherein said weight function is determined by a saturation threshold, a weight threshold and a slope.

6. The color adjustment device of claim 2, wherein said color shift value generating unit comprises:
   a grey level generator for receiving a first color value and generating a grey level;
   a transform unit for receiving said grey level and generating a color transform value according to said grey level and a color look-up table; and
   a color shift value calculator for receiving said weight and said color shift transform value and generating said color shift value.

7. The color adjustment device of claim 6, wherein said transform unit comprises:
   a grey level to color transform generator for receiving said grey level and generating a plurality of mapping values of a first color component and a plurality of mapping values of a second color component according to said grey level and said color look-up table;
   a first color component transform calculator for receiving said plurality of mapping values of said first color component and said plurality of mapping values of said second color component and generating a first color component transform value and a second color component transform value according to correlation of said grey level and said plurality of mapping values; and
   a second color component transform calculator for receiving said first color component transform value and said second color component transform value and generating a third color component transform value.

8. The color adjustment device of claim 3, wherein said color shift value generating unit comprises:
   a grey level generator for receiving a first color value and generating a grey level;
   a transform unit for receiving said grey level and generating a color transform value according to said grey level and a color look-up table;
   a color shift value calculator for receiving said weight and said color shift transform value and generating said color shift value.

9. The color adjustment device of claim 8, wherein said transform unit comprises:
   a grey level to color transform generator for receiving said grey level and generating a plurality of mapping values of a first color component and a plurality of mapping values of a second color component according to said grey level and said color look-up table;
   a first color component transform calculator for receiving said plurality of mapping values of said first color component and said plurality of mapping values of said second color component and generating a first color component transform value and a second color component transform value according to correlation of said grey level and said plurality of mapping values; and
   a second color component transform calculator for receiving said first color component transform value and said second color component transform value and generating a third color component transform value.

10. The color adjustment device of claim 1, wherein said color shift value generating unit comprises:
    a grey level generator for receiving a first color value and generating a grey level;
    a transform unit for receiving said grey level and generating a color transform value according to said grey level and a color look-up table;
    a color shift value calculator for receiving said weight and said color shift transform value and generating said color shift value.

11. The color adjustment device of claim 1, wherein said second color value is determined by adding said first color value and said color shift value.

12. A color adjustment device for adjusting the white color of an image, said color adjustment device comprising:
    a grey level generator for receiving a first color value of said image and generating a grey level;
    a grey level transform unit for receiving said grey level and generating a color shift transform value;
    a color shift value calculator for receiving said color shift transform value and generating a color shift value; and
    an adjustment unit for receiving said first color value and said color shift value and generating a second color value according to said first color value and said color shift value.

13. The color adjustment device of claim 12, wherein said transform unit comprises:
    a grey level to color transform generator for receiving said grey level and generating a plurality of mapping values of a first color component and a plurality of mapping values of a second color component according to said grey level and said color look-up table;
    a first color component transform calculator for receiving said plurality of mapping values of said first color component and said plurality of mapping values of said second color component and generating a first color component transform value and a second color component transform value according to correlation of said grey level and said plurality of mapping values; and a second color component transform calculator for receiving said first color component transform value and said second color component transform value and generating a third color component transform value.

14. A method for color adjustment for adjusting the white color of an image, said method comprising:

receiving, at a weight generating unit, a first color value of said image and generating a weight based on the first color value;

receiving, at a color shift value generating unit, said first color value and said weight and generating a color shift value based on said first color value and said weight; and receiving, at an adjusting unit, said first color value and said color shift value and generating a second color value based on said first color value and said color shift value.

15. The method for color adjustment of claim 14, wherein a saturation value is determined according to said first color value.

16. The method for color adjustment of claim 15, wherein said first color value comprises a plurality of color components and said saturation value is determined by subtracting the minimum of said color components from the maximum of said color components.

17. The method for color adjustment of claim 14, wherein the step of receiving said first color value and said weight and generating a color shift value according to said first color value and said weight comprises generating a grey level according to said first color value;

generating a color shift transform value according to said grey level and a color look-up table, and generating said color shift value according to said weight and said color shift transform value.

18. The method for color adjustment of claim 16, wherein the step of receiving said first color value and said weight and generating a color shift value according to said first color value and said weight further comprises:

generating a plurality of mapping values according to said grey level and said color look-up table;

generating a first color component transform value, a second color value component transform value and a third color component transform value according to said grey level and said plurality of mapping values; and generating a color transform value according to said first color component transform value, said second color value component transform value and said third color component transform value.

19. The method for color adjustment of claim 18, wherein said second color value is determined by adding said first color value and said color shift value to generate said second color value.

* * * * *